E. J. LOCKHART.
FISH BAIT OR LURE.
APPLICATION FILED SEPT. 19, 1908.

923,670.

Patented June 1, 1909.

Witnesses
Glora E. Braden
F. Gertrude Tallman

Inventor
Edward J. Lockhart
By Chappell & Earl
Attorneys

UNITED STATES PATENT OFFICE.

EDWARD J. LOCKHART, OF BATTLE CREEK, MICHIGAN.

FISH BAIT OR LURE.

No. 923,670.  Specification of Letters Patent.  Patented June 1, 1909.

Application filed September 19, 1908. Serial No. 453,815.

*To all whom it may concern:*

Be it known that I, EDWARD J. LOCKHART, a citizen of the United States, residing at Battle Creek, Michigan, have invented certain new and useful Improvements in Fish Baits or Lures, of which the following is a specification.

This invention relates to improvements in fish baits or lures.

The main objects of this invention are: First, to provide an improved fish bait or lure which has, when drawn through the water, a movement somewhat resembling that of a minnow. Second, to provide an improved fish bait or lure which is adapted to run under the surface of the water when in use, and, at the same time, one which will readily float.

Further objects, and objects relating to structural details, will definitely appear from the detailed description to follow.

I accomplish the objects of my invention by the devices and means described in the following specification. The invention is clearly defined and pointed out in the claims.

Figure 1:
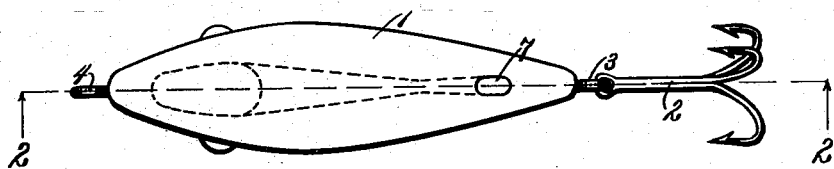
Figure 2:
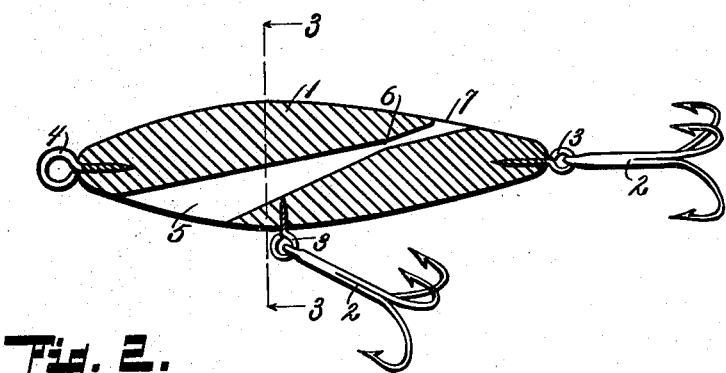
Figure 3:
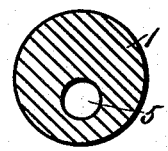

A structure embodying the features of my invention is clearly illustrated in the accompanying drawing, forming a part of this specification, in which:

Figure 1 is a plan view of my improved minnow. Fig. 2 is a longitudinal vertical section taken on a line corresponding to line 2—2 of Fig. 1. Fig. 3 is a cross section taken on a line corresponding to line 3—3 of Fig. 2.

In the drawings, similar reference characters refer to similar parts throughout the several views, and the sectional views are taken looking in the direction of the little arrows at the ends of the section lines.

Referring to the drawing, the body 1 of my improved minnow is preferably tapered toward each end, as illustrated. The hooks 2, illustrated, are secured to the body by means of the screw eyes 3. At the forward end of the body is a screw eye 4 for the attachment of the line. The body has a hole 5 extending upwardly and rearwardly therethrough, as clearly appears from the drawing. This hole is preferably tapered upwardly to the point 6 near its delivery end 7, it being expanded from the point 6 to its delivery end.

In use, when the bait is drawn through the water, the water engaging in the hole causes the bait to dive downwardly and run beneath the surface of the water. The water passing out of the delivery end of the hole not only causes an agitation in the surrounding water but also causes the bait to have a rocking or wiggling movement something like that of a minnow when swimming, thereby further attracting the attention of the fish.

I have illustrated and described my improved bait in detail in a form which I find desirable and very effective. I am aware, however, that the form of bait and arrangement of the hole therethrough may be very greatly varied and a desirable bait still be secured without departing from my invention.

Having thus described my invention, what I claim as new and desire to secure by Letters Patent is:

1. A fish bait or lure comprising a body having a hole extending upwardly and rearwardly therethrough, said hole being tapered inwardly to a point near its delivery end and then expanded outwardly; and hooks carried by said body.

2. A fish bait or lure comprising a body having a hole extending upwardly and rearwardly therethrough, said hole being tapered inwardly and then expanded outwardly; and hooks carried by said body.

3. A fish bait or lure comprising a body having a hole extending upwardly and rearwardly therethrough, the delivery end of said hole being smaller than its inlet end, and hooks carried by said body.

4. A fish bait or lure comprising a body having a hole extending upwardly and rearwardly therethrough; and hooks carried by said body.

In witness whereof, I have hereunto set my hand and seal in the presence of two witnesses.

EDWARD J. LOCKHART. [L. S.]

Witnesses:
 ALBERT C. KINGMAN,
 CHAS. E. ROOT.